United States Patent
Habimana et al.

[11] Patent Number: 6,087,461
[45] Date of Patent: Jul. 11, 2000

[54] PROCESS FOR MAKING SILYL ENDBLOCKED ORGANIC POLYMERS

[75] Inventors: Jean Habimana, Barry; Claire Thompson, Dinas Powys, both of United Kingdom

[73] Assignee: Dow Corning Limited, Barry, United Kingdom

[21] Appl. No.: 09/103,220

[22] Filed: Jun. 23, 1998

[30] Foreign Application Priority Data

Jun. 25, 1997 [GB] United Kingdom ............ 9713279

[51] Int. Cl.$^7$ ................ C08F 4/58; C08F 4/649
[52] U.S. Cl. .......... 526/194; 526/126; 526/134; 526/141; 526/185; 526/204; 526/346; 526/348.7
[58] Field of Search .............. 526/126, 194, 526/348.7, 134, 141, 185, 346

[56] References Cited

U.S. PATENT DOCUMENTS

| | | | |
|---|---|---|---|
| 3,655,633 | 4/1972 | Saam | 260/79 |
| 4,758,631 | 7/1988 | Kennedy | 525/245 |
| 5,527,929 | 6/1996 | Timmers | 556/7 |
| 5,578,690 | 11/1996 | Marks | 526/347 |
| 5,616,664 | 4/1997 | Timmers | 526/127 |
| 5,625,087 | 4/1997 | Devore | 556/468 |
| 5,811,501 | 9/1998 | Chiba et al. | 526/194 X |

FOREIGN PATENT DOCUMENTS

| | | |
|---|---|---|
| 0 329 891 | 10/1988 | European Pat. Off. |
| 4154816 | 5/1992 | Japan. |
| 08100028 | 4/1996 | Japan. |

OTHER PUBLICATIONS

M. Kamigaito, et al; J. Polym. Sci., Polym. Chem., vol. 29, pp. 1909–1915 (1991).
Y.X. Peng, et al; Polymer Bulletin, vol. 37, pp. 149–153 (1996).
Science, Vo. 260, Jun. 25, 1993, pp. 1917–1918 (1993).
Chemical Reviews,Vo. 95, pp. 1191–1201 (1995).

*Primary Examiner*—Fred Teskin
*Attorney, Agent, or Firm*—Alex Weitz

[57] ABSTRACT

A process for making silyl endblocked organic polymers of the formula $R^1_3SiM$ is disclosed which comprises contacting under anhydrous conditions M' monomers and/or oligomers of M' with a silyl cation $R^1_3Si^+$ devoid of any siloxane bonds wherein each $R^1$ independently denotes an optionally substituted hydrocarbon or hydrocarbonoxy group, hydrogen, a halogen or a monovalent siloxane-free silicon-containing group and M is an organic polymer made by the addition polymerisation of ethylenically unsaturated monomers M' of the formula $H(R^3)\!\!=\!\!C\!\!=\!\!C\!\!-\!\!(R^2)_2$ wherein each $R^2$ independently denotes an optionally substituted hydrocarbon, hydrogen or a halogen and $R^3$ denotes a hydrogen or methyl group. Preferably the monomer M' is an olefin.

12 Claims, No Drawings

PROCESS FOR MAKING SILYL ENDBLOCKED ORGANIC POLYMERS

This invention relates to a process for making silyl endblocked organic polymers and more particularly to a process for making silyl endblocked polyolefins.

Silyl endblocked organic polymers are organic polymers having a silicon-containing group at the end of the polymer chain linked via a Si—C bond. Silyl endblocked organic polymers are known and prior art methods for their preparation usually involve the reaction of a pre-formed polymer with a silicon-containing compound.

For example, in U.S. Pat. No. 4,758,631 a method of preparing allyl-terminated polyisobutylene polymer is described which comprises allylation of tertiary chlorocapped polyisobutylene with allyltrimethylsilane in the presence of a Friedel-Crafts Lewis Acid. Derwent abstract of JP 04154816 describes the reaction of an isobutylene polymer having branched terminal alkyl groups with an organosilicon chloride complex to form isobutylene polymers containing silyl groups at the end. Derwent abstract of JP 08100028 discloses the manufacture of isobutylene copolymers having reactive silicon groups which comprises, for example, the mixing of olefin-terminated isobutylene polymer, Pt-divinyltetramethyldisiloxane complex and methyldichlorosilane at 100° C. for 10 hours and at 80° C. for 2 hours to give a polymer containing silyl Si(Me) (OCMe)$_2$ and isopropyl units.

There has been a continued search for a process for making silyl endblocked organic polymers which does not use a pre-formed polymer thus forming the organic polymer and incorporating the silicon-containing group at the end of the organic polymer in a one-step process.

We have now found a process for the production of silyl endblocked organic polymers and more particularly silyl endblocked polyolefins in which the corresponding monomers and/or oligomers of the organic polymer are contacted with a silicon-containing compound.

According to the invention there is provided a process for making silyl endblocked organic polymers of the formula $R^1_3SiM$ by contacting under anhydrous conditions M' monomers and/or oligomers of M' with a silyl cation $R^1_3Si^{3\oplus}$ devoid of any siloxane bonds wherein each $R^1$ independently denotes an optionally substituted hydrocarbon or hydrocarbonoxy group, hydrogen, a halogen or a monovalent siloxane-free silicon-containing group and M is an organic polymer made by the addition polymerisation of ethylenically unsaturated monomers M' of the formula $H(R^3)$—C=C—$(R^2)_2$ wherein each $R^2$ independently denotes an optionally substituted hydrocarbon, hydrogen or a halogen and $R^3$ denotes a hydrogen or methyl group.

The use of silyl cations during a polymerisation process is known. WO 96/08519 provides a polymerisation process comprising contacting one or more addition polymerisable monomers under addition polymerisation conditions with a catalyst system which includes a silylium salt corresponding to the formula $R_3Si(X')_q^+A^-$ wherein R independently each occurrence is selected from the group consisting of hydrocarbyl, silyl, hydrocarbyloxy, dihydrocarbylamino and combinations thereof having up to 30 non-hydrogen atoms, X' is an optional, neutral Lewis base having up to 20 non-hydrogen atoms, q is zero or one and $A^-$ is a non-coordinating, compatible anion. However to form the catalyst system, the silylium salt requires to be contacted with a Group 4 metal complex.

In their studies of the cationic polymerisation of 1,3-pentadiene with $AlCl_3$ in n-hexane carried out in the presence of trimethylsilyl chloride, Y. X. Peng and W. M. Shi in Polymer Bulletin Volume 37, page 149 to 153 (1996) have proposed a theoretical route from trimethylsilyl chloride and 1,3-pentadiene to a silyl endblocked polymer. However Peng et al. state very clearly that this route has not been made to work in their process. It is also clear from the discussion and references (see M. Kamigaito, M. Sawamoto and T. Higashimura in J. Polym. Sci., Polym. Chem. (Part A), Volume 29, page 1909 to 1915 (1991)) that the formation of carbocation $C^+$ is intended rather than a silyl cation.

In a process according to the invention a silyl cation must be provided. A silyl cation is a species that contains an electron deficient tri-coordinate silicon atom. In the silyl cation $R^1_3Si^+$ used in a process according to the invention, each $R^1$ substituent independently denotes an optionally substituted hydrocarbon or hydrocarbonoxy group, hydrogen, a halogen or a monovalent siloxane-free silicon-containing group with the proviso that the silyl cation is devoid of any siloxane bonds (i.e. there is no presence of a Si—O—Si bond). Preferably $R^1$ represents an aliphatic or aromatic hydrocarbon or a halogen, more preferably an alkenyl or a saturated alkyl group and most preferably methyl, ethyl, vinyl, hexenyl or cyclopentenyl.

Methods for the preparation of silyl cations are known and are reported in Science Volume 260 pages 1917 to 1918 (1993) and Chemical Reviews Volume 95, pages 1191 to 1201 (1995). One method requires exchanging Z from a compound of the formula $R^1_3SiZ$ with a suitable counter-anion $B^-$ optionally in the presence of solvent wherein $R^1$ is as defined above and Z may be hydrogen or halogen. Preferably Z is hydrogen or chlorine and more preferably hydrogen. The reaction time required for the exchange in the preparation of the silyl cation will depend upon such factors as the reaction temperature, and the nature of the $R^1_3SiZ$ compound. Preferably the reaction time is between 5 minutes to 6 hours, preferably 5 to 90 minutes and more preferably 10 to 60 minutes.

We have found that particularly suitable $R^1_3SiZ$ compounds for formation of silyl cations for use in a process according to the invention include trimethylsilane, triphenylsilane, methyldiphenylsilane, dimethylphenylsilane, dimethylchlorosilane, methyldichlorosilane, trichlorosilane and vinyldimethylchlorosilane and tri(trimethylsilyl)silane more preferably triethylsilane, dimethylhexenylsilane and [1-(3-cyclopentenyl)-3,3-dimethylbutyl]dimethylsilane. $R^1_3SiZ$ compounds containing siloxane bonds have been found not suitable for use in a process according to the invention.

Compounds which provide counter-anions to be used for the exchange of Z are compounds having the formula $F^+B^-$ wherein $B^-$ is the counter-anion and $F^+$ is a hydrocarbyl group. The percentage of cationic character of silyl cations derived from a compound of the formula $R^1_3SiZ$ will be affected by the choice of counter-anion $B^-$. For example, the counter-anion may be of a non-coordinating nature such as arylborates and carboranes, for example, closocarboranes and bromocarboranes or of a highly coordinating nature such as derivatives of Lewis acids.

In the case of non-coordinating counter-anions, preferably the counter-anion $B^-$ is an arylborate ion, for example, tetrakis[bis(3,5-trifluoromethylphenyl)]borate ion, tetrakis (2,3,5,6-tetrafluorophenyl)borate ion, tetrakis(2,3,4,5-tetrafluorophenyl)borate ion, methyltris(perfluorophenyl) borate ion and phenyltris(perfluorophenyl)borate ion and more preferably the counter-anion is tetrakis (pentafluorophenyl)borate ion. The hydrocarbyl group $F^+$ may be represented by alkyl, aryl and aryl substituted alkyl groups, preferably aryl substituted alkyl groups and more preferably triphenylmethyl groups. Examples of suitable $F^+B^-$ compounds providing a counter-anion of a non-coordinating nature are triphenylmethyltetrakis[bis(3,5-trifluoromethylphenyl)]borate, triphenylmethyltetrakis(2,3,5,6-tetrafluorophenyl)borate, triphenylmethyltetrakis(2,3,4,5-tetrafluorophenyl)borate, triphenylmethylmethyltris(perfluorophenyl)borate and triphenylmethylphenyltris(perfluorophenyl)borate with triphenylmethyltetrakis(pentafluorophenyl)borate preferred.

The $F^+B^-$ compound may also be derived from a Lewis acid where for example, the Lewis acid provides a counter-anion $B^-$ with a tendency to highly coordinate to the silyl cation. Examples of suitable Lewis acids providing the counter-anion $B^-$ include aluminium alkyl halides, zirconium halides e.g. zirconium chloride, vanadium halides e.g. vanadium chloride, iron halides and complexes e.g. iron chloride and boron complexes. It is preferred that the Lewis acid is derived from halides of titanium, boron e.g. $BF_3$, aluminium or antimony, e.g. antimony chloride and more preferably the Lewis acids is derived from aluminium trichloride, aluminium alkyl chloride, e.g. $Al(C_2H_5)_2Cl$, titanium tetrachloride or boron trichloride. The hydrocarbyl group F is as defined above and is preferably a triphenylmethyl group which may be derived from, for example, triphenylmethylchloride or diphenylmethyl group derived from, for example, diphenylmethylchloride. For a process according to the invention it is preferred that the $F^+B^-$ compound is derived from a Lewis acid as the exchange of Z with $B^-$ can be less complex and expensive.

The $F^+ B^-$ compounds can be pre-prepared or prepared in situ whilst in contact with the $R^1_3SiZ$ compound. Example of pre-prepared $F^+B^-$ compounds include triphenylmethylhexachloroantimonate and triphenylmethylpentachlorostannate. Preferably in the case of Lewis acid derived $F^+B^-$ compounds the $F^+B^-$ compound is prepared in situ.

It is particularly preferred that in a process according to the invention the silyl cation is a reaction product of a prior process step in which $R^1_3SiZ$ has been contacted with $F^+B^-$ wherein $R^1$, Z, F and B are as defined above.

The silyl cation may be provided neat or in solvent. Suitable solvents include aromatic solvents, polar or non-polar solvents and mixtures of two or more of any of these types. Preferably non-polar solvents are not used for silyl cations having counter-anions derived from Lewis acids. Example of suitable solvents are chlorinated solvents, e.g., dichloromethane and 1,2-dichloroethane, nitrites, hexane, toluene and benzene. The solvent is preferably dichloromethane or toluene. It is preferred that oxygen containing solvents for example, methanol, are not used with the silyl cation. Alternatively the silyl cation may be prepared in situ in a process according to the invention. By preparing the silyl cation in situ the process gives all the advantages of a one-step process.

The ethylenically unsaturated monomers M' and/or oligomers of M' suitable for use in a process according to the invention are those which can undergo addition polymerisation.

The ethylenically unsaturated monomers M' are represented by the formula $H(R^3)$—C=C—$(R^2)_2$ wherein each $R^2$ and $R^3$ is as defined above. Preferably $R^2$ represents hydrogen or an alkyl group and more preferably methyl and preferably $R^3$ represents hydrogen. Suitable monomers M' for use in a process according to the invention include olefins e.g., ethylene, propylene, 1-butylene, 2-methyl-2-butene, isobutylene, 1-pentene, 1-hexene, 2-pentene, 2-hexene, 3-methyl-1-pentene, 4-methyl-1-pentene, 1-octene, 2-octene and 1-decene and other monomers such as styrene and substituted styrenes. Preferably M' represents an olefin having from 2 to 10 carbon atoms or styrene and more preferably isobutylene. Oligomers of M' may also be used. Oligomers are defined as polymerised molecules having fewer monomers than the polymer M for example, 2 to 50,000 monomers. Preferably monomers M' are used in a process according to the invention. A mixture of two or more types of monomers M' and/or oligomers of M' may also be used in a process according to the invention. Preferably however all monomer units M' have the same chemical structure.

$R^1_3SiM$ polymers produced by a process according to the invention have a M portion which is an organic polymer made by the addition polymerisation of M' monomers and/or oligomers of M'. Examples of M are polyethylene, polypropylene, polyisobutylene, polystyrene and polypropylene/polyisobutylene co-polymers. Preferably the M portion is a substantially linear polymer and most preferably M is polyisobutylene. The $R^1_3Si-$ portion of the polymers results from the silyl cation used. Examples of suitable silyl endblocking groups $R^1_3Si-$ are trimethylsilyl, triphenylsilyl, methyldiphenylsilyl, dimethylphenylsilyl, dimethylchlorosilyl, methyldichlorosilyl, trichlorosilyl, vinyldimethylsilyl and tri(trimethylsilyl) groups with [1-(3-cyclopentenyl)-3,3-dimethylbutyl]dimethylsilyl, dimethylhexenylsilyl and triethylsilyl preferred. The molecular weight of the silyl endblocked organic polymer may range from 500 to 1000000 preferably from 1000 to 500000. By careful selection of $R^1$ substituents the silyl endblocked polymers may provide silicon-bonded substituents (for example silicon-bonded hydrogen, chlorine or vinyl groups) which can react according to known organosilicon chemistry teaching. For example, the provision of a silicon-bonded vinyl group in the silyl endblocked organic polymer may allow reaction via hydrosilylation with silicon-bonded hydrogen atoms of organosilicon compounds.

A process according to the present invention may be carried out by merely mixing the reagents i.e. the ethylenically unsaturated monomers M' and/or oligomers of M' and the silyl cation $R^1_3Si^+$ in a reaction vessel optionally in the presence of a solvent. Alternatively the monomers and/or oligomers may be mixed directly with the pre-cursors of the silyl cation. Reaction conditions of temperature and pressure are not critical and will depend upon, for example, the monomer type and the desired end-product although it is preferred that a process according to the invention is carried out at a temperature of from below ambient to ambient temperature, for example, $-100$ to $25°$ C., more preferably $-100$ to $0°$ C. and most preferably at $-80$ to $-20°$ C. and at a pressure of from above and below atmospheric pressure. Preferably the reaction is at atmospheric pressure.

It is important that a process according to the invention is carried out in anhydrous conditions. The term "anhydrous" indicates that there is no free water present in the system i.e. no water is present which is able to interfere with the polymerisation reaction. The anhydrous conditions may be achieved by, for example, drying the reagents by known methods and/or by adding a suitable water scavenger to the reaction mixture for example, 4-methyl-2,6-di-tert-butylmethylpyridine and 4-tert-butyl-2,6-di-tert-butylmethylpyridine. It is preferred that the amount of water scavenger used is sufficient to merely remove any free water available. Excess scavenger may interfere with the reaction conditions, for example, the availability of the silyl cation or inhibit polymerisation.

A process according to the invention may be performed in the absence of solvent, however, it is preferred that a solvent is present. Suitable solvents include aromatic solvents, non-polar and polar solvents and mixtures of two or more of these. However it is preferred that non-polar solvents are not used when silyl cations derived form Lewis acids are present. Examples of suitable solvents are chlorinated solvents such as dichloromethane and 1,2-dichloroethane, nitrites, hexane, benzene, toluene and xylene. It is preferred that oxygen containing solvents for example methanol are not used as the reaction medium. The solvent is preferably dichloromethane. A process according to the invention may be carried out in a continuous or batch mode. The process is preferably performed in an inert atmosphere for example nitrogen or argon.

Sufficient silyl cation is employed to achieve the desired rate of polymerisation having regard to the temperature of the process, starting materials and other factors. In most cases it is preferred to employ from 0.001 to 10%. by weight of the silyl cation based on the total weight of monomers and/or oligomers.

When the desired silyl endblocked organic polymer has been produced, the process may be terminated by, for example, the inactivation of the counter-anion. Deactivation may be achieved by the addition of a neutralising agent such as methanol, methanolic solution of ammonium hydroxide and sodium methoxide or by heating at high temperatures. The silyl endblocked polymer $R^1{}_3SiM$ may be recovered from the reaction mixture by, for example, extraction, precipitation, centrifugation, solvent evaporation and/or other forms of separation techniques and may be purified as required.

Silyl endblocked polymers made according to a process of the invention are usefully employed in a variety of applications, for example, in sealing materials, adhesives or as intermediates for the production of siloxane-organic copolymers.

The following examples are provided to illustrate the invention in conjunction with comparative examples.

EXAMPLE 1

Preparation of Triethylsilyl Endblocked Polyisobutylene using Isobutylene, Triethylsilane and Triphenylmethyl-tetrakis(pentafluorophenyl) borate (TTFB)

a: Pre-preparation of Silyl Cation.

1.1 g of liquid isobutylene and $2 \times 10^{-3}$ g of 4-methyl-2,6-di-tert-butylmethylpyridine (DBMP) were added to a reaction flask A containing 22 ml of toluene (previously dried over calcium hydride and stored under argon) and cooled to $-78°$ C. In a separate reaction flask B, 117.7 µmole TTFB (synthesised according to the method of Chien et al. as described in the Journal of American Chemical Society 1991, Volume 113, pages 8570 to 8571) was mixed with 117.7 µmole of triethylsilane in 2 ml of toluene and the mixture allowed to react for 60 minutes at 25° C. before addition via a syringe to the reaction flask A. The temperature of the reaction was maintained at approximately $-78°$ C. for a further 20 minutes before termination by the addition of a methanolic solution of ammonium hydroxide. The reaction mixture was then subjected to the following work-up procedure. Solvent was removed from the reaction mixture by stripping the mixture under reduced pressure. The recovered reaction product was dissolved in tetrahydrofuran (THF) and precipitated in 0.5 l methanol and then characterised by GPC, $^{29}Si$ and $^{13}C$ NMR. The reaction product was shown to be polyisobutylene endblocked with triethylsilyl groups with a $^{29}Si$ NMR chemical shift at 9.0 ppm attributed to the silicon in the $(C_2H_5)_3\underline{Si}CH_2$-terminal unit and $^{13}C$ NMR chemical shifts of 6.17 ppm and 5.79 ppm attributed to the methyl and methylene groups respectively in the $(\underline{CH_3CH_2})_3SiCH_2$ terminal unit.

b: In-situ Preparation of Silyl Cation.

0.50 g, 0.785 mmol of TTFB was added to a reaction flask and dried under vacuum at 150° C. The reaction flask was cooled by immersion in an acetone-dry ice bath and 20 ml of anhydrous dichloromethane (dried over phosphorus pentoxide) and 2.4 ml of liquid isobutylene were distilled into the reaction flask. 0.785 mmol of DBMP dissolved in anhydrous dichloromethane and 0.785 mmol triethylsilane were added to the reaction flask via a syringe and stirred under nitrogen for one hour at $-60°$ C. The reaction was quenched by the addition of methanol (2 ml). Solvent was removed from the mixture by stripping the reaction mixture under reduced pressure. The reaction product was dissolved in hexane (2 ml) and precipitated in an excess of methanol (200 ml). Characterisation of the reaction product by GPC and $^{29}Si$ NMR indicated that the product was triethylsilyl endblocked polyisobutylene (Mw 62100, Mw/Mn 1.39) with a $^{29}Si$ NMR chemical shift at 9.00 ppm attributed to the silicon in the $(C_2H_5)_3\underline{Si}CH_2$-terminal unit.

COMPARATIVE EXAMPLE 1

Absence of Water Scavenger

The procedure of Example 1a was repeated, in the absence of DBMP using 1.518 g of liquid isobutylene, 463.2 µmole of TTFB and 463.2 µmole of triethylsilane.

Characterisation of the reaction product by GPC, $^{29}Si$ and $^{13}C$ NMR indicated that the isobutylene had polymerised to form polyisobutylene (Mw 17440, Mw/Mn 5.76) with no triethylsilyl endblocking units present. This example shows the importance of working in anhydrous conditions.

EXAMPLE 2

Preparation of Silyl Endblocked Polyisobutylene using Isobutylene, Dimethylhexenylsilane and TTFB The procedure of Example 1b was repeated using 0.785 mmol of dimethylhexenylsilane in place of triethylsilane. Characterisation of the reaction product by GPC and $^{29}Si$ NMR indicated that the product was dimethylhexenylsilyl endblocked polyisobutylene (Mw 10100, Mw/Mn 2.75) with a $^{29}Si$ NMR chemical shift at 7.65 ppm attributed to the silicon in the $Me_2(CH_2=CHCH_2CH_2CH_2CH_2)\underline{Si}CH_2$-terminal unit.

EXAMPLE 3

Preparation of Silyl Endblocked Polystyrene using Styrene, Triethylsilane and TTFB The procedure of Example 1a was repeated using 1.82 g, 48 mmol of pre-distilled styrene in place of the isobutylene. Triethylsilyl endblocked polystyrene (Mw 326000, Mw/Mn 2.35) was obtained in 89% yield with a $^{29}Si$ NMR shift of 6.29 ppm corresponding to the silicon in the $(C_2H_5)_3\underline{Si}CH_2$-terminal unit.

EXAMPLE 4

Preparation of Silyl Endblocked Polystyrene using Styrene, Dimethylhexenylsilane and TTFB The procedure of Example 1b was repeated using 0.785 mmol of dimethylhexenylsilane and 1.82 g, 48 mmol of predistilled styrene in place of triethylsilane and isobutylene respectively. Dimethylhexenylsilyl endblocked polystyrene (Mw 52000, Mw/Mn 2.58) was obtained in quantitative yield with a $^{29}$Si NMR shift of 7.90 ppm corresponding to the silicon in the Me$_2$(CH$_2$=CHCH$_2$CH$_2$CH$_2$CH$_2$)SiCH$_2$-terminal unit.

EXAMPLE 5

Preparation of Silyl Endblocked Polyisobutylene using Isobutylene, Triethylsilane, Titanium Tetrachloride and Triphenylmethylchloride a: Use of Dichloromethane as Solvent.

0.641 g (2.3 mmole) of triphenylmethylchloride was added to a reaction flask and dried under reduced pressure. The reaction flask was cooled to −70° C. in an acetone-dry ice bath and 20 ml of dry dichloromethane (distilled over phosphorous pentoxide), 5.6 g of isobutylene and 0.2 mmole of DBMP were added to the flask. 4 ml of titanium tetrachloride (1M solution in dichloromethane) was then added to the flask followed by the injection of 0.233 g (2 mmole) of triethylsilane. The reaction mixture was stirred for 30 minutes at approximately −70° C. under nitrogen before the addition of excess of methanol (2 ml) to quench the reaction. The reaction product was recovered following the work-up procedure of Example 1a. Characterisation of the resulting polymer via $^{29}$Si NMR indicated that the polymer was triethylsilyl endblocked polyisobutylene with a $^{29}$Si NMR signal at −9.0 ppm corresponding to the silicon in the (C$_2$H$_5$)$_3$SiCH$_2$-terminal unit.

b: Use of Hexane as Solvent.

The procedure of Example 5a was repeated using hexane in place of dichloromethane. The $^{29}$Si NMR indicated that the resulting polymer was triethylsilyl endblocked polyisobutylene with a $^{29}$Si NMR signal at 9.04 ppm corresponding to the silicon in the triethylsilyl group.

EXAMPLE 6

Preparation of Silyl Endblocked Polyisobutylene using Isobutylene, Dimethylhexenylsilane, Titanium Tetrachloride and Triphenylmethylchloride The procedure of Example 5a was repeated using dimethylhexenylsilane in place of triethylsilane. The resulting polymer was dimethylhexenylsilyl endblocked polyisobutylene at 70% yield with a $^{29}$Si NMR signal at 7.435 ppm corresponding to dimethylhexenylsilyl terminal groups.

EXAMPLE 7

Preparation of Silyl Endblocked Polyisobutylene using Isobutylene, Dimethylhexenylsilane and Triphenylmethyl hexachloroantimonate 0.52 g (1.87 mmole) of triphenylmethylhexachloroantimonate was added to a 50 ml reaction flask, pre-dried with a heat gun under reduced pressure and then 30 ml of dry methylene chloride, 0.5 mmole of DBMP was added. The mixture was cooled to approximately −70° C. before the addition of 9.5 ml (0.1 mole) of isobutylene and 0.2 ml (1.38 mmole) of dimethylhexenylsilane. The reaction mixture was stirred for a period of 30 minutes at approximately −70° C. The polymerisation was terminated by the addition of methanol and the reaction product recovered by following the work-up procedure of Example 1a. The $^{29}$Si NMR of the reaction polymer indicated that dimethylhexenylsilyl endblocked polyisobutylene was formed with a signal at 7.435 ppm corresponding to dimethylhexenylsilyl terminal groups and this was also confirmed by a $^1$H NMR signal at 0.466 ppm corresponding to —CH$_2$—Si(CH$_3$)$_2$C$_6$H$_{11}$.

EXAMPLE 8

Preparation of Silyl Endblocked Polystyrene using Styrene, Dimethylchlorosilane, Chlorodiethylaluminium and Triphenylmethylchloride 0.69 g (2.48 mmole) of triphenylmethylchloride was added to a dry reaction flask followed by 30 ml of dry methylene chloride and 0.5 mmole of DBMP. The mixture was cooled to approximately −70° C. and then 4.5 g (0.043 mole) of styrene, 0.5 ml (4.8 mmole) of dimethylchlorosilane and 4 ml of chlorodiethylaluminium (1 M solution in hexane) were added. After a reaction period of 30 minutes the reaction product was recovered following the work-up procedure of Example 1a. Characterisation of the resulting polymer indicated the presence of dimethylsilyl end groups attached to polystyrene with a $^{29}$Si NMR signal at −18.716 ppm.

EXAMPLE 9

Preparation of Silyl Endblocked Polyisobutylene using Isobutylene, Dimethylchlorosilane, Titanium Tetrachloride and Triphenylmethylchloride The procedure of Example 8 was repeated using 0.957 g (3.44 mmole) of triphenylmethylchloride and 0.4 ml (2.8 mmol) of chlorodimethylsilane. 3.6 g (0.064 mole) of isobutylene and 4 ml of titanium tetrachloride (1 M solution in dichloromethane) was used in place of styrene and chlorodiethylaluminium. Characterisation of the reaction product indicated the presence of silyl endblocking groups attached to polyisobutylene with a $^{29}$Si NMR signal at −18.92 ppm.

That which is claimed is:

1. A process for making silyl endblocked organic polymers of the formula R$^1_3$SiM said process comprising contacting under anhydrous conditions, components comprising a reagent selected from the group consisting of M' monomers, oligomers of M' and mixtures thereof, with a silyl cation R$^1_3$Si$^+$ wherein each R$^1$ is independently selected from the group consisting of unsubstituted hydrocarbons, unsubstituted hydrocarbonoxy groups, hydrogen, halogens and monovalent siloxane-free silicon-containing groups, M' is an ethylenically unsaturated monomer having the formula H(R$^3$)—C=C—(R$^2$)$_2$, each R$^2$ is independently selected from the group consisting of unsubstituted hydrocarbons, substituted hydrocarbons, hydrogen and halogens, R$^3$ is selected from the group consisting of hydrogen and a methyl group and M is an organic polymer made by the addition polymerisation of M'.

2. A process according to claim 1 wherein M' is an olefin.

3. A process according to claim 1 wherein M' is isobutylene.

4. A process according to claim 1 wherein all M' monomers used to make organic polymer M have the same chemical structure.

5. A process according to claim 1 wherein the oligomers of M' used to make the organic polymer M are based on M' monomers which all have the same chemical structure.

6. A process according to claim 1 wherein the silyl cation R$^1_3$Si$^+$ is prepared by contacting compound of the formula R$^1_3$SiZ with compound F$^+$B$^-$ wherein each $R^1$ is independently selected from the group consisting of unsubstituted hydrocarbons, unsubstituted hydrocarbonoxy groups, hydrogen, halogens and monovalent siloxane-free silicon-containing groups, Z is selected from the group consisting of a hydrogen and chlorine, B is selected from the group consisting of arylborates, carboranes and derivatives of Lewis acids and F is selected from the group consisting of alkyl groups, aryl groups and aryl substituted alkyl groups.

7. A process according to claim 6 wherein the silyl cation $R^1_3Si^+$ is prepared prior to contacting it with the monomer and oligomer reagents.

8. A process according to claim 1 wherein at least one group of the silyl cation is selected from the group consisting of alkenyl groups and saturated alkyl groups.

9. A process according to claim 1 which is conducted in the presence of a water scavenger.

10. A process according to claim 1 which is conducted at a temperature of from −100 to 0° C.

11. A process according to claim 1 which is conducted in the presence of a solvent.

12. A process according to claim 1 wherein from 0.001 to 10% by weight of the silyl cation is used based on the total weight of monomers M' and oligomers of M'.

* * * * *